United States Patent
Köhler

(10) Patent No.: US 12,241,607 B2
(45) Date of Patent: Mar. 4, 2025

(54) LIGHT GUIDE FOR A LIGHTING DEVICE OF A VEHICLE AND LIGHTING DEVICE WITH SUCH A LIGHT GUIDE

(71) Applicant: Hella GmbH & Co. KGaA, Lippstadt (DE)

(72) Inventor: Stefan Köhler, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/770,195

(22) Filed: Jul. 11, 2024

(65) Prior Publication Data

US 2024/0360969 A1  Oct. 31, 2024

Related U.S. Application Data

(60) Division of application No. 17/935,819, filed on Sep. 27, 2022, which is a continuation of application No. PCT/EP2020/059986, filed on Apr. 8, 2020.

(51) Int. Cl.
*F21S 41/24* (2018.01)

(52) U.S. Cl.
CPC ................................ *F21S 41/24* (2018.01)

(58) Field of Classification Search
CPC ............ F21S 41/24; F21S 43/235–251; G02B 6/0001–001; G02B 6/0033–0038
See application file for complete search history.

(56) References Cited

U.S. PATENT DOCUMENTS

| | | | |
|---|---|---|---|
| 6,056,426 A | 5/2000 | Jenkins | |
| 2007/0139955 A1 | 6/2007 | Godbillon et al. | |
| 2008/0225548 A1 | 9/2008 | Eichelberger | |
| 2009/0154167 A1* | 6/2009 | Lin | F21V 7/0008 362/310 |

FOREIGN PATENT DOCUMENTS

| | | |
|---|---|---|
| DE | 102012108855 A1 | 3/2014 |
| DE | 102014201413 A1 | 7/2015 |
| EP | 3190332 A1 | 7/2017 |

* cited by examiner

*Primary Examiner* — Jason M Han
(74) *Attorney, Agent, or Firm* — Husch Blackwell LLP

(57) ABSTRACT

A light guide is provided for a lighting device of a vehicle. The light guide includes an entrance surface into which light can enter, at least one lateral exit surface from which a portion of the light that has entered can exit, an end region through which a portion of the light that has entered can exit. The end region is structured and/or shaped in such a way that a portion of light which laterally emerges from the region adjacent to the end region after reflection at or in the end region is reduced or minimised.

12 Claims, 3 Drawing Sheets

PRIOR ART

LIGHT GUIDE FOR A LIGHTING DEVICE OF A VEHICLE AND LIGHTING DEVICE WITH SUCH A LIGHT GUIDE

CROSS REFERENCE

This application claims priority to U.S. Utility application Ser. No. 17/935,819, filed Sep. 27, 2022, which claims priority to and the benefit of PCT Application No. PCT/EP2020/059986, filed Apr. 8, 2020, the entirety of which is hereby incorporated by reference.

FIELD OF THE INVENTION

The present invention concerns a light guide for a lighting device of a vehicle as well as a lighting device with such a light guide.

BACKGROUND OF THE INVENTION

A light guide and a lighting device of the above mentioned type are known from DE 10 2012 108 855 A1. The lighting device described therein comprises a light guide with an entrance surface at the front, into which the light of a light source can enter. The light guide further comprises a plurality of prism-shaped coupling-out elements opposite an exit surface through which a portion of the light entering can exit laterally. The end section of the light guide facing away from the frontal entrance surface is not disclosed in detail in DE 10 2012 108 855 A1.

Such an end region 2 of a light guide 1, for example, has a flat surface 3 as shown in FIG. 5. With the light guide shown in FIG. 5 the light 4 can exit the light guide 1 through an exit surface 5 located on the right hand outer side. This exit surface 5 points, for example, in the forward direction of travel of the vehicle indicated by the arrow 6.

Reflections of light 4 from the flat surface 3 prove to be problematic in such a design, FIG. 5 shows some examples of light beams 7 that are reflected by the flat surface 3 and then emerge laterally from the light guide 1 in the end region 2. These light beams 7 run in unwanted directions and therefore prove to be disturbing. They also impair the appearance of the lighting device, for example by creating so-called hot spots, because the end area appears as a bright light spot.

BRIEF SUMMARY OF THE INVENTION

The problem underlying the present invention is the creation of a light guide and a lighting device of the type mentioned above, in which the portion of light escaping unwantedly from the end area is reduced.

The end region is structured and/or shaped in such a way that the portion of light which laterally emerges from the region adjacent to the end region after reflection at or in the end region is reduced or minimised. By an appropriate design, disturbing light beams and an impairment of the appearance of the lighting device can be largely avoided.

It may be provided that the end region is structured at least in sections. A suitable structure can be used to reduce the portion of light reflected back which is disturbingly emitted laterally.

There is the possibility that the end region is at least in sections conical or frustoconical in shape, in particular wherein the base of the cone or the frustum of a cone faces the light guide. For example, the light guide has a conical tip in the end region. In this tapered geometry, a large portion of the light is transmitted into the tip, where a large part of it exits from the tip in a widely scattered form. A possibly back-reflected part is mostly reflected back into the light guide out of the end area and is only very unlikely to exit laterally in the end area. In this way, the disturbing light rays exiting laterally are almost completely avoided.

It may be provided that the end region comprises a plurality of conical or frustoconical sections which are in particular arranged next to one another. This plurality of conical or frustoconical sections also makes it possible to largely avoid the disturbing light rays emerging laterally. However, a plurality of conical or truncated conical sections can be more space-saving than a single large conical or frustoconical end section.

It is possible that the end region has a plurality of circumferential structures, in particular coaxially circumferential structures. These structures may be similar to Fresnel lenses, for example. These structures can also largely avoid the disturbing light rays that emerge sideways and at the same time be more space-saving than a single large conical or frustoconical end region.

It may be provided that the entrance surface is arranged at the end of the light guide remote from the end region. In general, it has been found to be practicable to couple the light into the light guide at the front end, as in the state of the art. However, laterally arranged entrance surfaces are also possible.

It is intended that the lighting device comprises a light guide according to the invention.

It is possible that the light guide is arranged in the lighting device in such a way that, when the lighting device is installed in a vehicle, the light emerging from the at least one lateral exit surface can exit the vehicle, preferably at least partially forwards in the longitudinal direction of the vehicle.

It may be provided that an absorption device is arranged in front of the end region of the light guide, which can at least partially absorb the light emerging from the end of the light guide. In this way the light emerging from the end of the light guide can be prevented from propagating in undesirable directions.

Alternatively, it may be provided that a reflection device is arranged in front of the end region of the light guide, which can at least partially reflect back the light emerging from the end of the light guide, preferably reflect it back in a broadly scattered manner. The proportion of light propagating in unwanted directions can also be significantly reduced by, for example, uniform scattering in many different directions.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

In the figures, identical or functionally identical parts are marked with identical reference signs.

Figure 1:
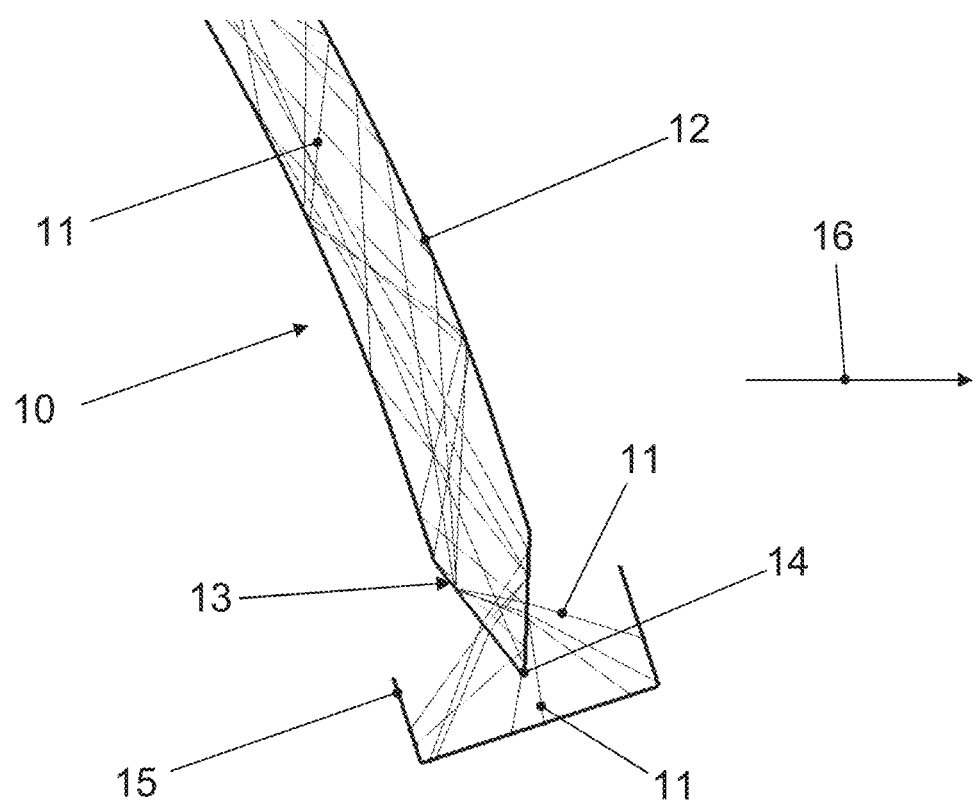
FIG. 1 is a schematic side view of a detail of a first embodiment of a lighting device according to the invention with a first embodiment of a light guide according to the invention and sketched light beams.

The lighting device shown in FIG. 1 comprises a light guide 10 with an entrance surface not shown, into which light 11 can enter. The entrance surface can be located in particular at the front end of the light guide 10 not shown in the illustration. Furthermore the light guide 10 comprises an exit surface 12 through which the light 11 can exit laterally. On the side of the light guide 10 opposite the exit surface 12, a non-imaged plurality of, for example, prism-shaped coupling-out elements can be arranged which deflect the light 11 in the direction of the exit surface 12.

In particular, the illuminating device may be fitted to a vehicle in such a way that the exit surface 12 faces forward in the direction of travel of the vehicle indicated by the arrow 16.

The light guide 10 shown in FIG. 1 also includes an end region 13, which is conical in shape so that a large portion of the light 11 is transmitted in this conical geometry to the tip 14 of the end section 13. There the light 11 is distributed over a large solid angle range. Any reflected light is substantially reflected back out of the end region 13 into the light guide and is only very unlikely to exit laterally in the end region 13. In this way, the disturbing light rays emitted laterally are largely avoided.

The illuminating device further comprises an absorption device 15 placed in front of the tip 14 of the light guide 10 and capable of absorbing the light 11 emerging from the tip 14. The absorption device 15, for example, is designed as a housing open on one side into which the light 11 can enter. The inner surfaces of the housing may be coated with absorbing materials, for example blackened.

Figure 2:
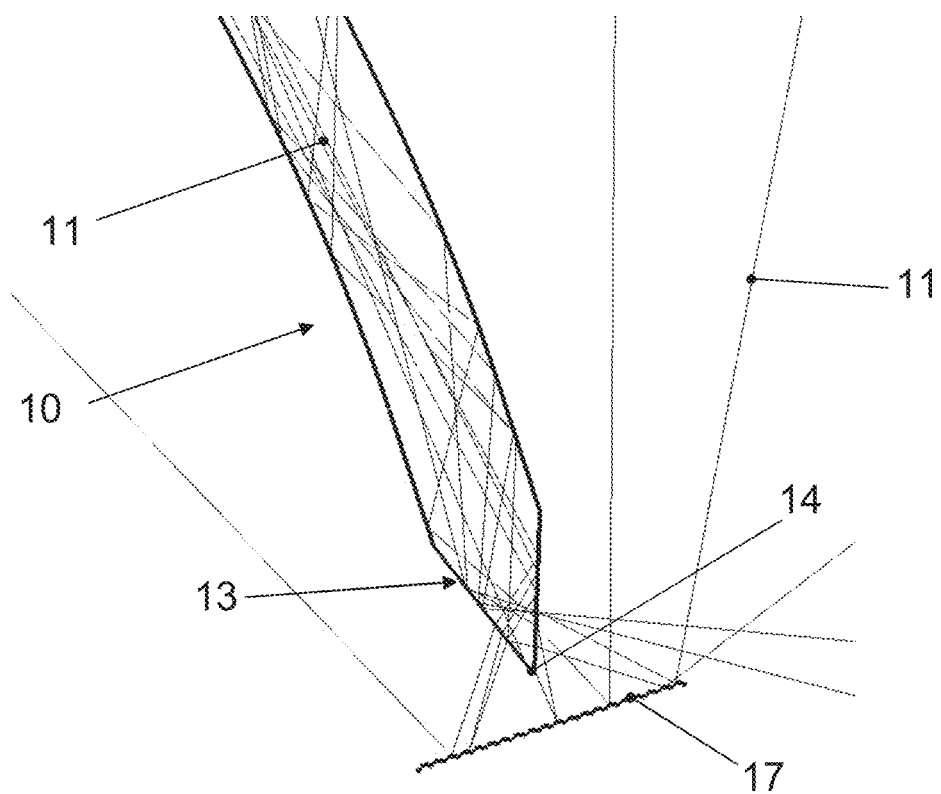
FIG. 2 is a schematic side view of a detail of a second embodiment of a lighting device according to the invention with a second embodiment of a light guide according to the invention and sketched light beams.

In the version shown in FIG. 2, instead of the absorption device 15, a reflection device 17 is arranged, which can at least partially reflect back the light 11 emerging from the tip 14 of the light guide 10. The reflection device 17 can, for example, be designed as barrel optics. By means of the reflection device 17, the light 11 can, in particular, be distributed comparatively evenly over a large solid angle range, so that an impairment of the appearance of the illumination device can also be largely avoided by this measure.

Figure 3:
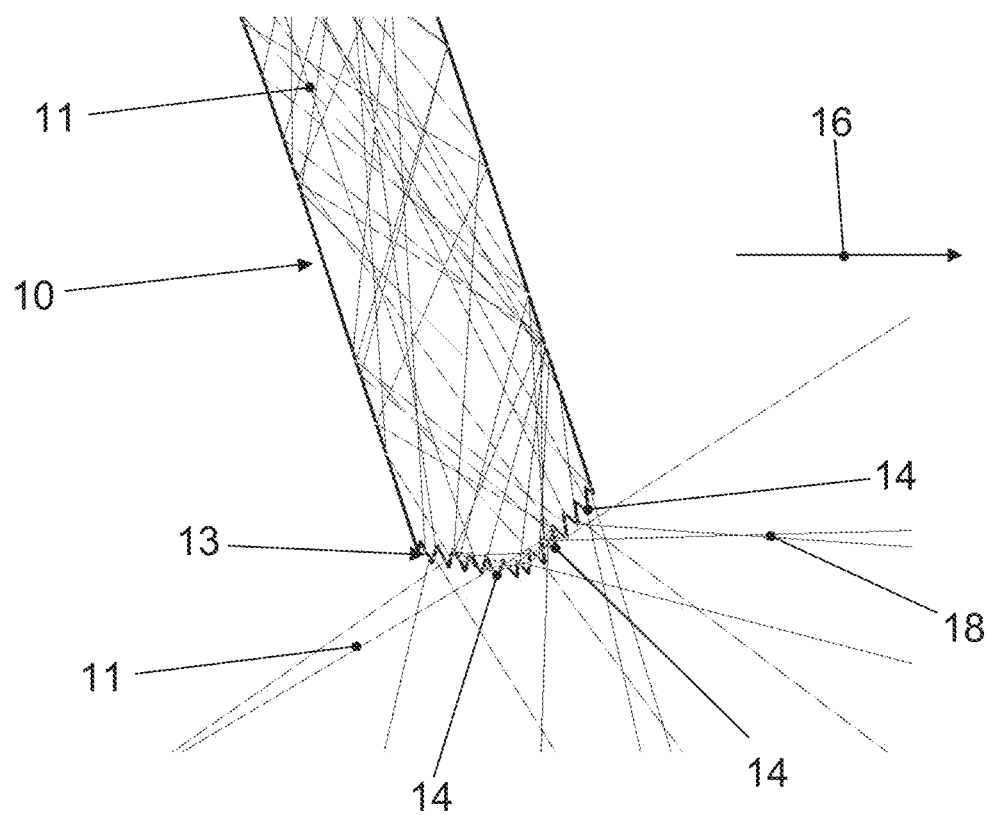
FIG. 3 is a schematic side view of a detail of a third embodiment of a light guide according to the invention with sketched light beams.

The design of a light guide 10 shown in FIG. 3 has a number of separate cones in the end section 13 instead of a single cone. Through each of the tips 14 the light 11 emerges into a large spatial angle range, so that overall a comparatively even distribution over a large solid angle range is achieved. In particular, a portion 18 of light 11 emerging in the direction of travel 16 can make a positive contribution to the light distribution produced by the lighting device.

Figure 4:
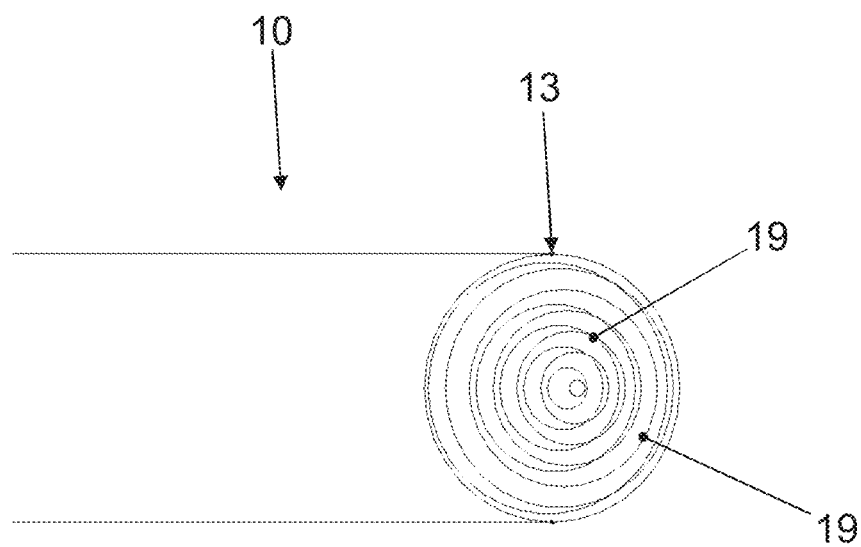
FIG. 4 is a schematic side view of a detail of a fourth embodiment of a light guide according to the invention.
Figure 5:
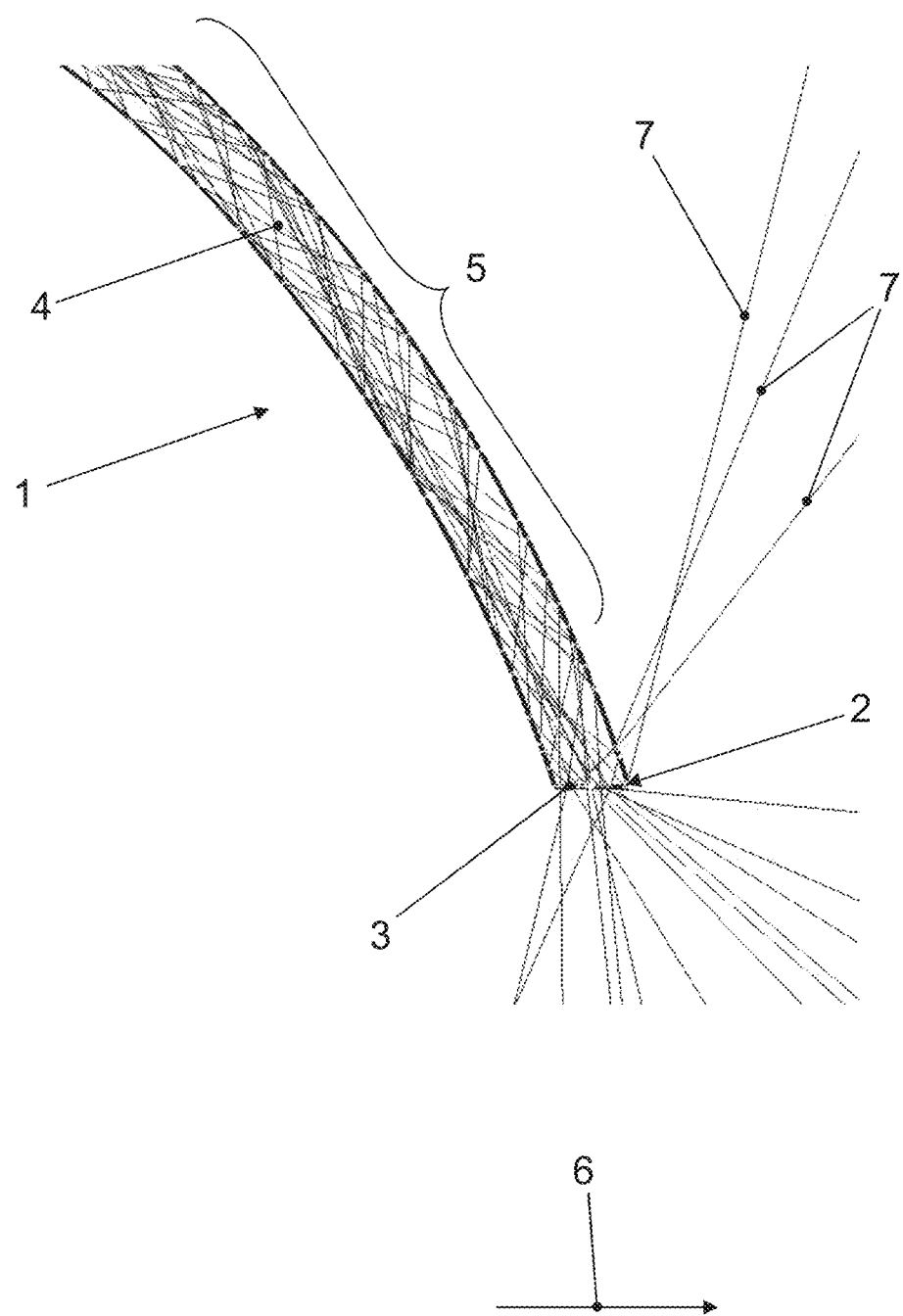
FIG. 5 is a schematic side view of a detail of an embodiment of a light guide of the prior art with sketched light beams.

The design of a light guide 10 shown in FIG. 4 has a plurality of coaxially circumferential structures 19 in the end region 13 instead of a plurality of separate cones. These structures 19 can be similar to Fresnel lenses, for example. These structures 19 can also largely avoid the disturbing light rays emerging laterally and at the same time be more space-saving than a single large conical or frustoconical end region 13.

LIST OF REFERENCE SIGNS 1 light guide
2 end region of the light guide 1
3 plane surface of the end region 2
4 light entering the entrance surface of light guide 1
5 exit surface of the light guide 1
6 direction of travel
7 light beam that emerges laterally from the light guide 1 in the end region 2
10 light guide
11 light entering the entrance surface of the light guide 10
12 exit surface of the light guide 10
13 end region of the light guide 10
14 tip 14 of the end region 13
15 absorption device
16 direction of travel
17 reflection device
18 light emitted in direction of travel 16
19 circumferential structure in the end region 13

The invention claimed is:

1. A light guide for a lighting device of a vehicle, the light guide comprising:
   an entrance surface into which light enters,
   at least one lateral exit surface from which a portion of the light that has entered exits,
   an end region having a plurality of cones through which a portion of the light that has entered exits, each cone including a peak and a circular base, and
   a crevice positioned between each pair of adjacent cones,
   wherein the end region is structured such that a portion of light which laterally emerges from the region adjacent to the end region after reflection at or in the end region is reduced.

2. The light guide according to claim 1, wherein the entrance surface is arranged at an end of the light guide remote from the end region.

3. The light guide according to claim 1, wherein the light guide is positioned in a lighting device for a vehicle.

4. The light guide according to claim 3, wherein the light guide is arranged in the lighting device in such a way that, when the lighting device is installed in a vehicle, the light emerging from the at least one lateral exit surface of the light guide can exit the vehicle.

5. A light guide for a lighting device of a vehicle, the light guide comprising:
   an entrance surface into which light enters;
   at least one lateral exit surface from which a portion of the light that has entered exits; and
      an end region having a plurality of cones from which a portion of the light that has entered exits, each cone including a peak and a circular base,
   wherein an absorption device is arranged in front of the end region of the light guide, which at least partially absorbs the light that exits from the end region.

6. A light guide for a lighting device of a vehicle, the light guide comprising:
   an entrance surface into which light enters;
   at least one lateral exit surface from which a portion of the light that has entered exits; and
   an end region having a plurality of cones from which a portion of the light that has entered exits, each cone including a peak and a circular base, and
   wherein a reflection device is arranged in front of the end region of the light guide, which at least partially reflects back the light that exits from the end region.

7. A light guide for a lighting device of a vehicle, the light guide comprising:
an entrance surface into which light enters,
at least one lateral exit surface from which a portion of the light that has entered exits,
an end region having a plurality of coaxially circumferential structures through which a portion of the light that has entered exits,
wherein the end region is structured such that a portion of light which laterally emerges from the region adjacent to the end region after reflection at or in the end region is reduced.

8. The light guide according to claim 7, wherein the entrance surface is arranged at an end of the light guide remote from the end region.

9. The light guide according to claim 7, wherein the light guide is positioned in a lighting device for a vehicle.

10. The light guide according to claim 9, wherein the light guide is arranged in the lighting device in such a way that, when the lighting device is installed in a vehicle, the light emerging from the at least one lateral exit surface can exit the vehicle.

11. The light guide according to claim 9, wherein an absorption device is arranged in front of the end region of the light guide, which at least partially absorbs the light that exits from the end of the light guide.

12. The light guide according to claim 9, wherein a reflection device is arranged in front of the end region of the light guide, which at least partially reflects back the light that exits from the end of the light guide.

\* \* \* \* \*